(12) United States Patent
Hoyos (10) Patent No.: US 12,114,612 B1
(45) Date of Patent: Oct. 15, 2024

(54) MUSHROOM GROW KIT

(71) Applicant: FORAGER CORP., Coral Gables, FL (US)

(72) Inventor: Humberto Hoyos, Coral Gables, FL (US)

(73) Assignee: FORAGER CORP., Coral Gables, FL (US)

( * ) Notice: Subject to any disclaimer, the term of this patent is extended or adjusted under 35 U.S.C. 154(b) by 0 days.

(21) Appl. No.: 18/189,915

(22) Filed: Mar. 24, 2023

(51) Int. Cl.
*A01G 18/65* (2018.01)
*A01G 18/61* (2018.01)
*A01G 18/69* (2018.01)

(52) U.S. Cl.
CPC ............. *A01G 18/65* (2018.02); *A01G 18/61* (2018.02); *A01G 18/69* (2018.02)

(58) Field of Classification Search
CPC ........ A01G 18/00; A01G 18/61; A01G 18/64; A01G 18/65; A01G 18/69
See application file for complete search history.

(56) References Cited

U.S. PATENT DOCUMENTS

| | | | | |
|---|---|---|---|---|
| 1,773,648 | A * | 8/1930 | Steves | A01G 18/69 71/21 |
| 3,242,614 | A * | 3/1966 | Thompson | A01G 18/64 47/1.1 |
| 4,543,744 | A * | 10/1985 | Royster | A01G 9/00 47/60 |
| 4,646,465 | A * | 3/1987 | Fujimoto | A01G 18/55 47/1.1 |
| 4,852,297 | A * | 8/1989 | Moren | A01G 18/64 47/1.1 |
| 4,878,312 | A * | 11/1989 | Shimizu | A01G 18/66 47/1.1 |
| 4,979,332 | A * | 12/1990 | Nagaya | A01H 4/001 47/69 |
| 5,282,874 | A * | 2/1994 | Tsukagoshi | A01G 18/64 220/366.1 |
| 5,372,616 | A * | 12/1994 | Mizuno | A01G 18/64 47/1.1 |

(Continued)

FOREIGN PATENT DOCUMENTS

| | | | | |
|---|---|---|---|---|
| CN | 109042091 A | * | 12/2018 | ............. A01G 18/62 |
| CN | 109042092 A | * | 12/2018 | ............. A01G 18/64 |

(Continued)

*Primary Examiner* — Monica L Perry
*Assistant Examiner* — Aaron M Rodziwicz
(74) *Attorney, Agent, or Firm* — ALBERT BORDAS P.A.

(57) ABSTRACT

A mushroom grow assembly has a top cover, a base assembly, a post and a transparent cover. The top cover includes a concave wall with a peripheral edge, a top opening, through openings and an upper receiving housing. The base assembly includes a lateral wall, a bottom wall and lower receiving housing. The post has a bottom wall that is mounted to the lower receiving housing and a top edge that is introduced inside the upper receiving housing. The transparent cover is mounted to the edges of base assembly and the top cover, surrounding said post. The top cover further includes a light assembly and a water chamber disposed inside said upper receiving housing. The post is filled with mushroom inoculated substrate. The base assembly, in an upside down disposition, can replace the top cover to allow at least one additional mushroom grow assembly be stacked below.

17 Claims, 6 Drawing Sheets

(56) References Cited

U.S. PATENT DOCUMENTS

| | | | | |
|---|---|---|---|---|
| 5,561,946 | A | * | 10/1996 | Hsien .................. A01G 13/04 47/60 |
| 6,748,696 | B1 | * | 6/2004 | Davidson .............. A01G 18/62 435/283.1 |
| 2011/0277383 | A1 | * | 11/2011 | Arora .................. A01G 18/64 47/1.1 |
| 2018/0359946 | A1 | * | 12/2018 | Rossi ...................... A01G 9/20 |
| 2022/0015309 | A1 | * | 1/2022 | Kong .................. A01G 24/30 |
| 2022/0400628 | A1 | * | 12/2022 | Reimnitz .............. G08C 17/02 |
| 2023/0172119 | A1 | * | 6/2023 | Lee .................. A01G 27/008 47/66.1 |

FOREIGN PATENT DOCUMENTS

| | | | | |
|---|---|---|---|---|
| CN | 109328882 A | * | 2/2019 | ............. A01G 18/64 |
| CN | 114208594 A | * | 3/2022 | ............. A01G 18/00 |
| DE | 3718288 A1 | * | 12/1988 | |
| JP | 3177619 U | * | 8/2012 | ......... A01G 13/0237 |
| JP | 2017216995 A | * | 12/2017 | ............. A01G 18/00 |
| KR | 20090121823 A | * | 11/2009 | |
| KR | 101012290 B1 | * | 2/2011 | |
| KR | 101028954 B1 | * | 4/2011 | |
| KR | 20120015791 A | * | 2/2012 | |
| KR | 101220035 B1 | * | 1/2013 | |
| KR | 20130112587 A | * | 10/2013 | |
| KR | 20130142753 A | * | 12/2013 | |
| KR | 20140034592 A | * | 3/2014 | |
| KR | 20140114681 A | * | 9/2014 | |
| KR | 200474879 Y1 | * | 10/2014 | |
| KR | 20170081407 A | * | 7/2017 | |
| KR | 20200056680 A | * | 5/2020 | |
| KR | 20200087509 A | * | 7/2020 | |
| WO | WO-2018198404 A1 | * | 11/2018 | ............. A01G 18/00 |
| WO | WO-2021143254 A1 | * | 7/2021 | ............. A01G 18/00 |

* cited by examiner

MUSHROOM GROW KIT

FIELD OF THE INVENTION

The present invention relates to grow kits, and more particularly, to plant and mushroom grow assemblies.

DESCRIPTION OF THE RELATED ART

Applicant is not aware of any other prior art suggesting the novel features of the present invention.

SUMMARY OF THE INVENTION

The instant invention is a mushroom grow assembly, comprising a top cover, a base assembly, a post and a transparent cover.

The top cover comprises a top cover wall having a top end and a peripheral edge. The a top cover wall further comprises a top opening and at least one through opening. The peripheral edge has a first diameter. The top cover further comprises an upper receiving housing. The upper receiving housing has a substantially cylindrical shape and comprises a first lateral wall, a first upper end and a first lower edge. The first lateral wall extends downwardly a first predetermined distance from the top end.

The top cover further comprises a water chamber disposed inside the upper receiving housing. The water chamber has a substantially cylindrical shape and comprises a second lateral wall, a second upper end and a first bottom wall.

The base assembly has a second diameter, which is of the same dimensions that the first diameter.

The post has a substantially cylindrical shape having a third diameter. The post comprises a third lateral wall and a bottom wall. The third lateral wall has a top edge and at least two holes. The bottom wall is mounted to the base assembly and the top edge is introduced inside the upper receiving housing.

The transparent cover is mounted to the base assembly and the top cover, surrounding the post. The transparent cover has a fourth diameter.

The first lateral wall has a fifth diameter. The second lateral wall has a sixth diameter. The sixth diameter of the second lateral wall is smaller than the fifth diameter of the first lateral wall, and the sixth diameter is smaller the third diameter of the of post.

The second lateral wall has at least one lateral opening, and the bottom wall has at least one bottom hole. The second lateral wall extends downwardly from the top opening a second predetermined distance. The second lateral wall has a sixth diameter.

The first lateral wall has an hygrometer holder. The hygrometer holder holds a hygrometer, which measures the amount of water vapor/humidity/air moisture with within the mushroom grow assembly.

The top cover further comprises a light assembly that is secured to the interior of the top cover wall adjacent to the peripheral edge. The light assembly is preferably configured to be battery charged and comprises a full spectrum light strip, at least one light, a battery and a charger port or power cord opening disposed close to one of the at least one through opening.

The top opening cooperatively receives a cap, and each of the at least two through openings cooperatively receive a filter cap. The filter cap is configured to let air goes through while keep a bacteria free environment within mushroom grow assembly.

The sixth diameter of the second lateral wall is smaller than the fifth diameter of the first lateral wall, and the sixth diameter is smaller the third diameter of the of post.

The top edge is introduced inside the upper receiving housing until it reaches the top end in a way that an upper portion of the post is housed within the upper receiving housing. The water chamber is cooperatively disposed inside the upper portion of the post.

The first diameter of the peripheral edge, the second diameter of the base assembly and the fourth diameter of the transparent cover are of the same dimensions.

The transparent cover comprises a fourth lateral wall, a first upper edge and a second lower edge. The first upper edge has an upper channel and the second lower edge has a lower channel.

The base assembly further comprises a fifth lateral wall and a third bottom wall. The fifth lateral wall has a second upper edge. The base assembly further comprises lower receiving housing, the lower receiving housing has a sixth lateral wall with a third upper edge and a lower end.

An alternate embodiment of the base assembly further comprises peripheral holes. The alternate base assembly, in an upside down disposition, can replace the top cover to allow at least one additional mushroom grow assembly be stacked below.

The upper channel cooperatively receive the peripheral edge therein, and the lower channel cooperatively receive the second upper edge therein.

The first predetermined distance is such that the first lower edge reaches and is horizontally aligned with the peripheral edge. The second predetermined distance is shorter that the first predetermined distance.

The water chamber further includes a water pump, which is installed within the water chamber and covers the at least one bottom hole. The water pump is connected to the hygrometer to pump water into the post through the lateral openings according to the needs set and measured by the hygrometer.

The post is filled with an inoculated substrate, the inoculated substrate comprising, but is not limited to, mushroom substrate. Other substrates may be used for other types of species to grow.

It is therefore one of the main objects of the present invention to provide a mushroom grow assembly comprising a top cover, a base assembly, a post and a transparent cover.

It is another object of this invention to provide a mushroom grow assembly having the features and conditions to effectively grow mushrooms or other desirable herbs.

It is another object of this invention to provide a mushroom grow assembly having the features to control and keep the required light and humidity to grow mushrooms or other desirable herbs.

It is another object of this invention to provide a mushroom grow assembly that keeps a free bacteria environment within mushroom grow assembly.

It is another object of this invention to provide a mushroom grow assembly that is volumetrically efficient for carrying, transporting, and storage.

It is another object of this invention to provide a mushroom grow assembly that can be readily assembled and disassembled without the need of any special tools.

It is another object of this invention to provide a mushroom grow assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Referring now to the drawings, the present invention is generally referred to with numeral 10. It can be observed that it basically includes top cover 20, post 80, transparent cover 100, and base assembly 120.

Figure 1:
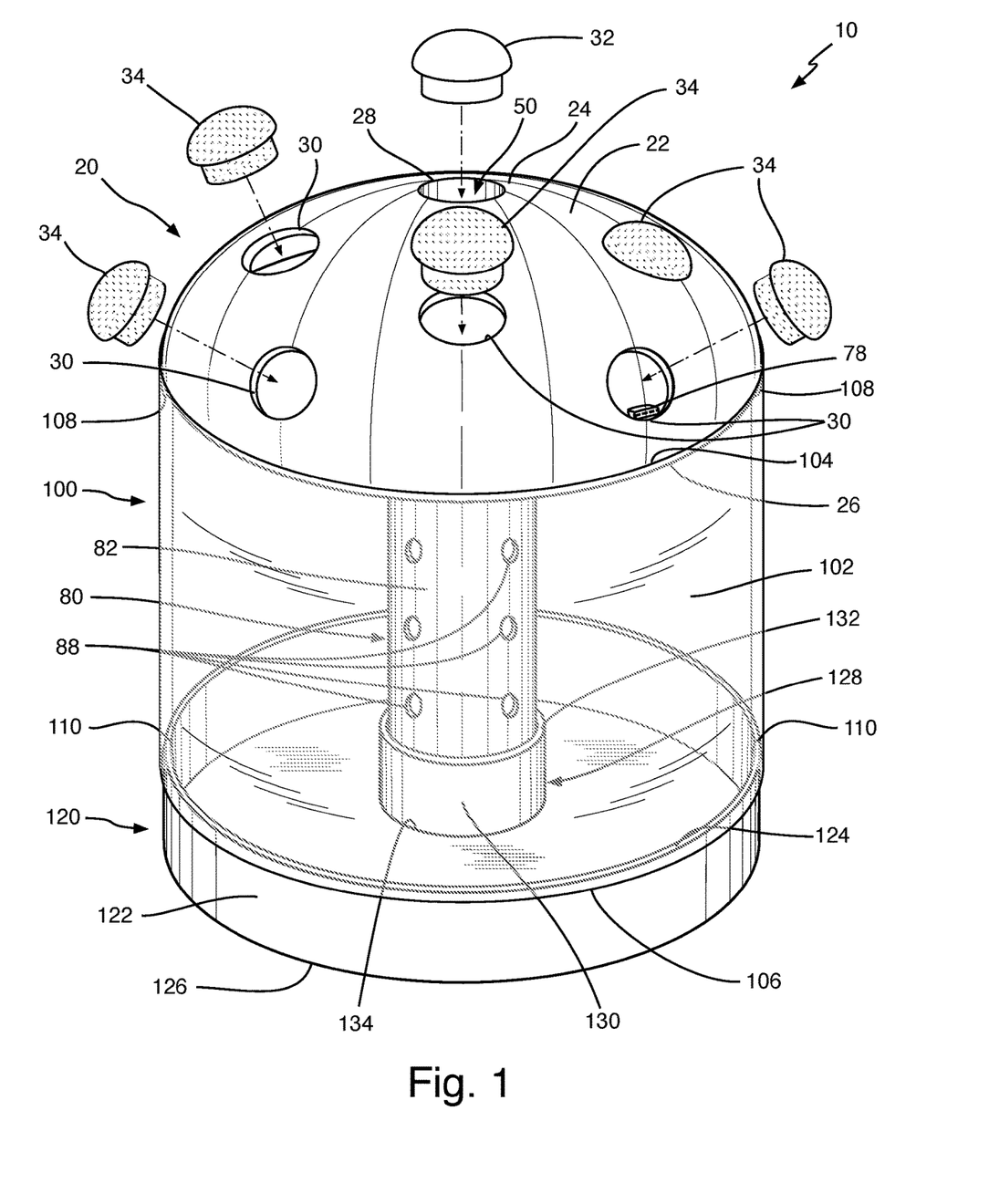
FIG. 1 represents an isometric view of a mushroom grow assembly, showing several filter caps and an upper cap removed.

As seen in FIG. 1, post 80 is mounted at base assembly 120 and top cover 20 is mounted to the top of post 80 with transparent cover 100 mounted to top cover 20 and base assembly 120.

Figure 2:
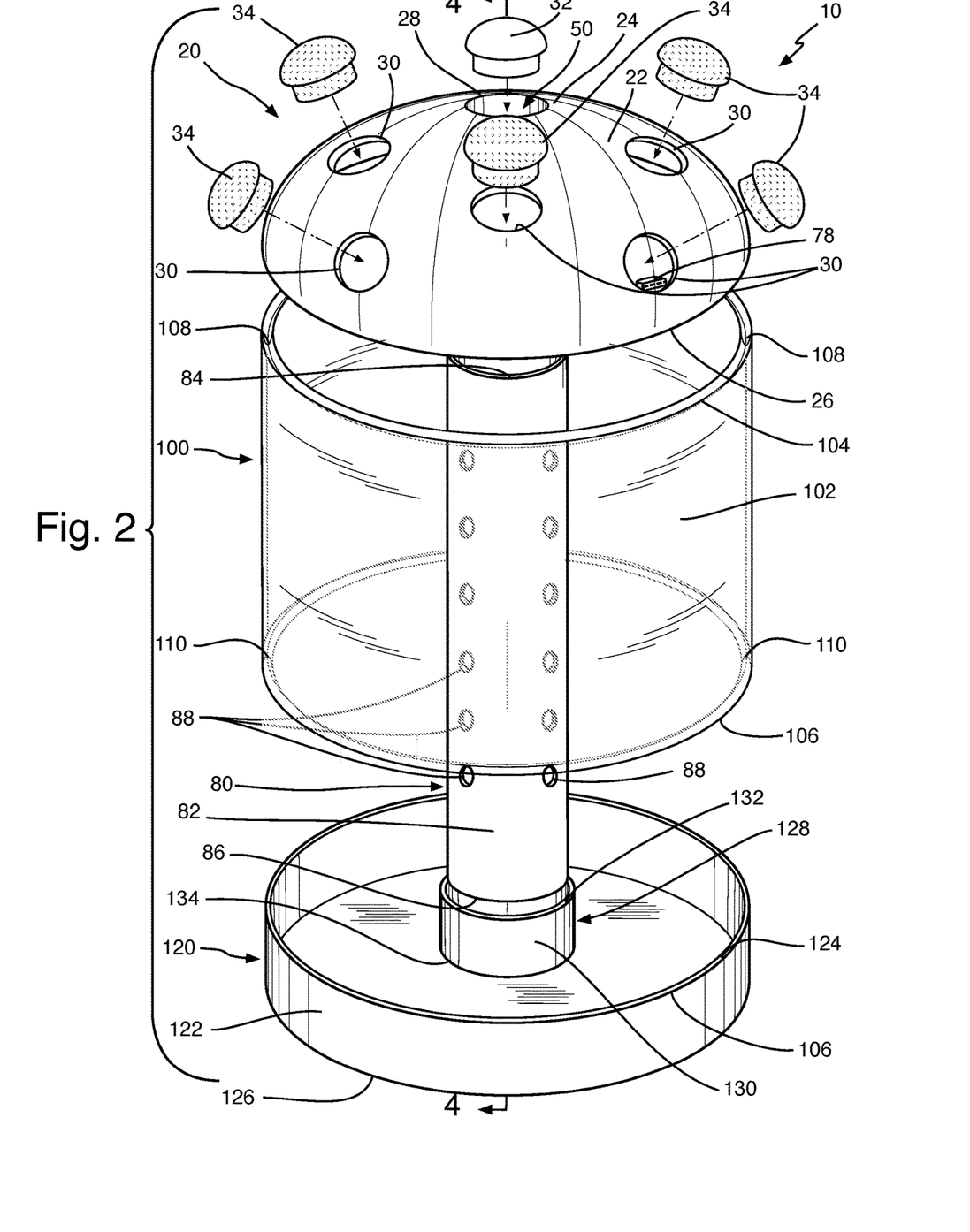
FIG. 2 is a top exploded view of the present mushroom grow assembly.
Figure 3:
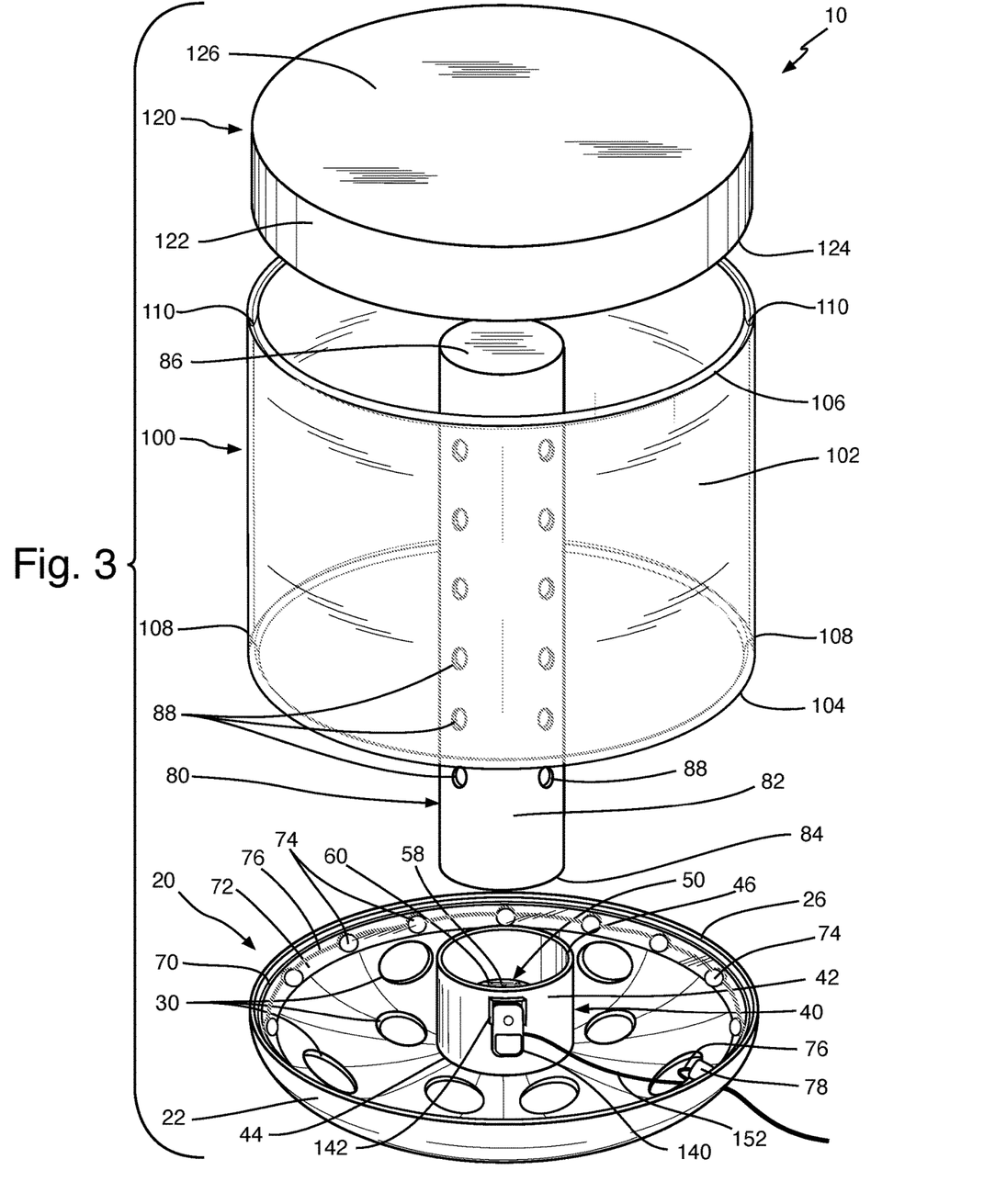
FIG. 3 is a bottom exploded view of the present mushroom grow assembly.

As seen in FIGS. 2 and 3, top cover 20 comprises top cover wall 22 having top end 24 and peripheral edge 26. Top cover wall 22 further comprises top opening 28 and through openings 30. Top opening 28 cooperatively receives cap 32 and through openings 30 cooperatively receive filter caps 34. Filter caps 34 let the air goes through while keep a free bacteria environment within mushroom grow assembly 10.

Top cover 20 further comprises upper receiving housing 40, water chamber 50 and light assembly 70.

Figure 4:
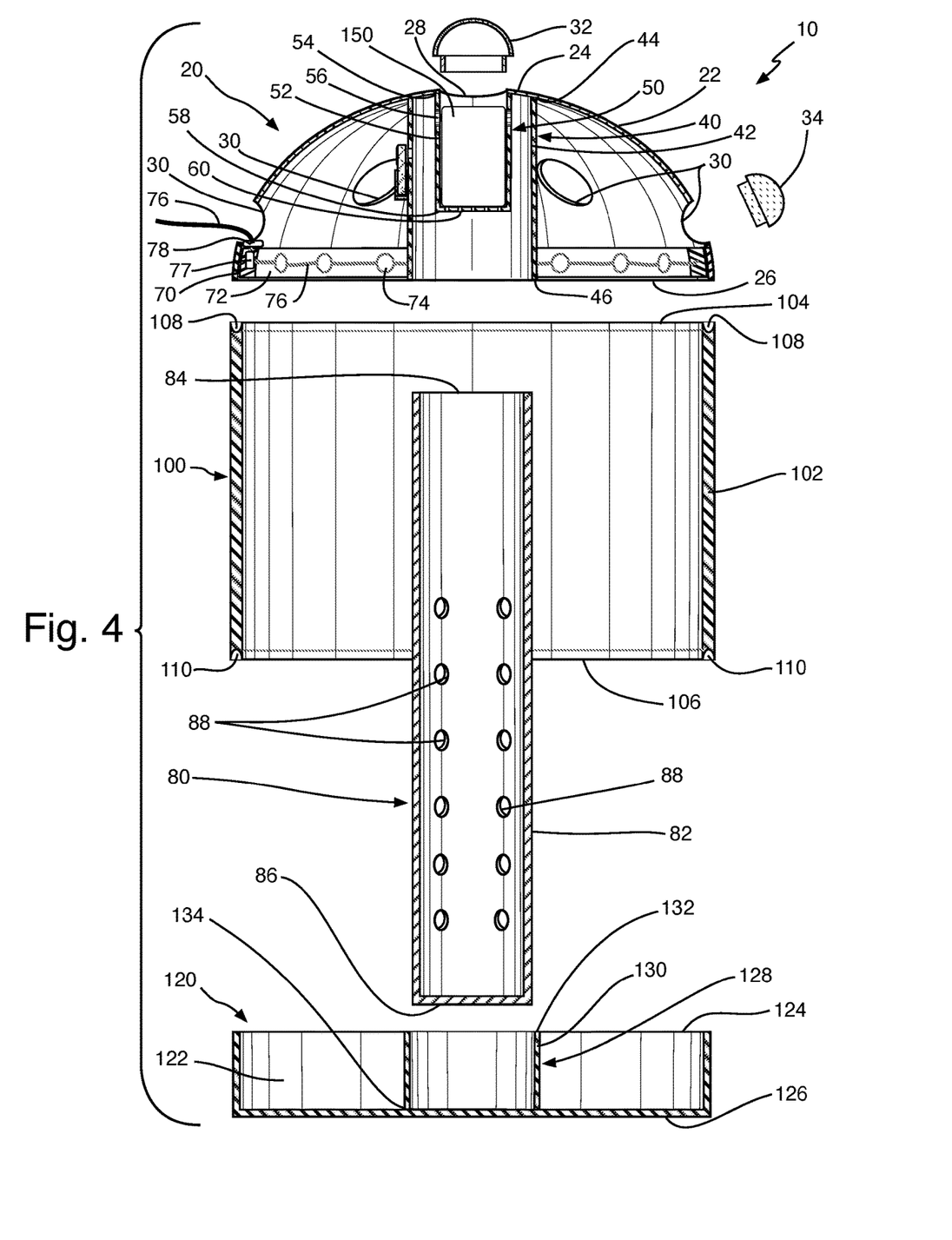
FIG. 4 is a cross-section view taken along lines 4-4 from FIG. 2.

As also seen in FIG. 4, upper receiving housing 40 has a substantially cylindrical shape and extend downwardly a first predetermined distance from top end 24. Upper receiving housing 40 comprises lateral wall 42, upper end 44 and lower edge 46. Lateral wall 42 has hygrometer holder 142, which holds hygrometer 140. Hygrometer 140 measures the amount of water vapor within mushroom grow assembly 10. Hygrometer 140 relies its humidity measurement on other parameters, such as temperature, pressure, and/or dew point (temperature of condensation) or other parameters according to the type of hygrometer used.

Water chamber 50 is disposed inside upper receiving housing 40. Water chamber 50 has a cylindrical shape and extends downwardly from top opening 28 a second predetermined distance. Water chamber 50 has lateral wall 52, upper end 54, lateral openings 56 and bottom wall 58 with bottom holes 60. The diameter of lateral wall 52 is smaller than the diameter of upper receiving housing 40 and even smaller than the diameter of post 80. Accordingly, post 80 is housed by upper receiving housing 40 and water chamber fits inside the upper portion of post 80. In the preferred embodiment, upper end 54 is peripherally connected to top opening 28. Accordingly, cap 32, in addition to close top opening 28, closes the entrance of water chamber 50. In a preferred embodiment, a user fills water chamber 50 with a predetermined amount of water. Bottom holes 60 have a very small diameter, which guarantee that water is discharged from water chamber 50 through bottom holes 60, drop by drop, into an interior of post 80. Another embodiment includes water pump 150 installed within water chamber 50. When installed, water pump 150 covers bottom holes 60 to block additional leakage of water into post 80. Water pump 150 is remotely connected to hygrometer 140. Water pump 150 pumps water into post 80 through lateral openings 56 according to the needs set and measured by hygrometer 140.

Light assembly 70 is secured to the interior of top cover wall 22 adjacent to peripheral edge 26. Light assembly 70 comprises light strip 72, lights 74, battery 77 and charger port 78. Charger port 78 is disposed close to one of openings 30 to facilitate its access to charger C (seen in FIG. 5). Light assembly 70 is implemented with battery charged lights arranged within a strip, such as light strip 72, preferably. Other embodiments may include removable/replaceable light assemblies. Light assembly 70 may be a light emitting diode (LED) assembly.

As best seen in FIG. 4, lower edge 46 extends downwardly a first predetermined distance from top end 24. The first predetermined distance is such that lower edge 46 reaches and is horizontally aligned with peripheral edge 26. Also, it is noticed that the second predetermined distance is shorter that the first predetermined distance (water chamber 50 from top opening 28).

Post 80 has a substantially cylindrical shape with a diameter slightly smaller than the diameter of upper receiving housing 40, but larger than the diameter of water chamber 50. Post 80 comprises lateral wall 82, with top edge 84 and bottom wall 86. Lateral wall 82 has holes 88.

Transparent cover 100 is mounted to top cover 20 and base assembly 120, surrounding post 80 and keeping the required humidity inside, while it let the exterior light goes through. Transparent cover 100 has basically a same diameter than top cover 20 and base assembly 120. Transparent cover 100 comprises lateral wall 102, upper edge 104, lower edge 106. Upper edge 104 has peripheral upper channel 108 and lower edge 106 has peripheral lower channel 110.

Base assembly 120 has a substantially cylindrical shape. Base assembly 120 comprises lateral wall 122 with upper edge 124 and bottom wall 126. Base assembly 120 further comprises lower receiving housing 128. Lower receiving housing 128 has lateral wall 130 with upper edge 132 and lower end 134, fixed to bottom wall 126.

Figures 5, 6:
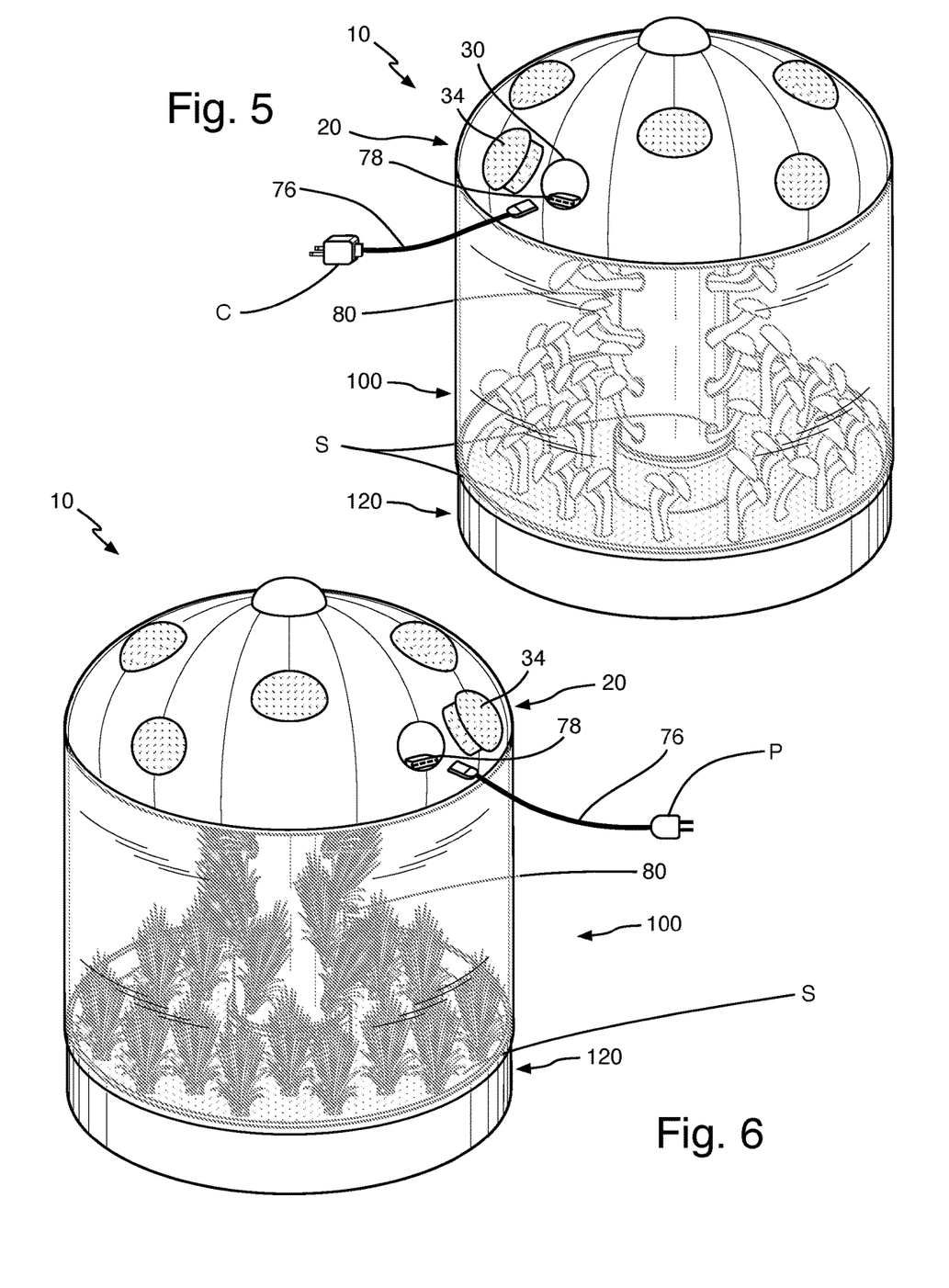
FIG. 5 is an assembled mushroom grow assembly in use, wherein mushrooms have been grown.
FIG. 6 is an assembled mushroom grow assembly in use, wherein plants or herbs, other than mushrooms, have been grown.

As seen in FIGS. 5 and 6, to assemble mushroom grow assembly 10, bottom wall 86 of post 80 and a portion adjacent thereof, is mounted into base assembly 120, specifically within lower receiving housing 128.

Top edge 84 is introduced inside upper receiving housing 40 until it reaches top end 24. The portion adjacent to top edge 84 is then housed within upper receiving housing 40 and water chamber 50 is cooperatively disposed inside the upper portion of post 80.

As seen in FIGS. 5 and 6, cable 76 with charger C, or power connector P, can be used to connect charger port 78 for charging of battery 77.

In the preferred embodiment, post 80 is filled with inoculated substrate S. Inoculated substrate S is implemented with a mushroom substrate as a medium to allow mushroom to develop and establish itself. The substrate offers the nutrition, moisture, and energy that mushrooms require to grow. Other substrates may be used for other types of species to grow, such as the shown in FIG. 6. The cavity defined between lateral wall 122 and lateral wall 130 is also filled with inoculated substrate S.

Upper channel 108 is cooperatively configured to fitly receive peripheral edge 26 therein. Lower channel 110 is cooperatively configured to fitly receive upper edge 124 therein. Transparent cover 100 is then mounted to base assembly 120, with lower channel 110 mounted onto upper edge 124. Top cover 20 is mounted to the top of post 80 and to transparent cover 100 with upper channel 108 receiving upper edge 26. Top edge 84 is introduced inside upper receiving housing 40 until it reaches top end 24, and water chamber 50 is disposed inside the upper portion of post 80.

Mushroom grow assembly 10 can be used to grow mushrooms, as shown in FIG. 5 and/or to grow other type of herbs, as shown in FIG. 6. It is noticed that other type of plants can be grown in mushroom grow assembly 10, including, but not limited to, flowering plants such as, but not limited to, orchids.

Figure 7:
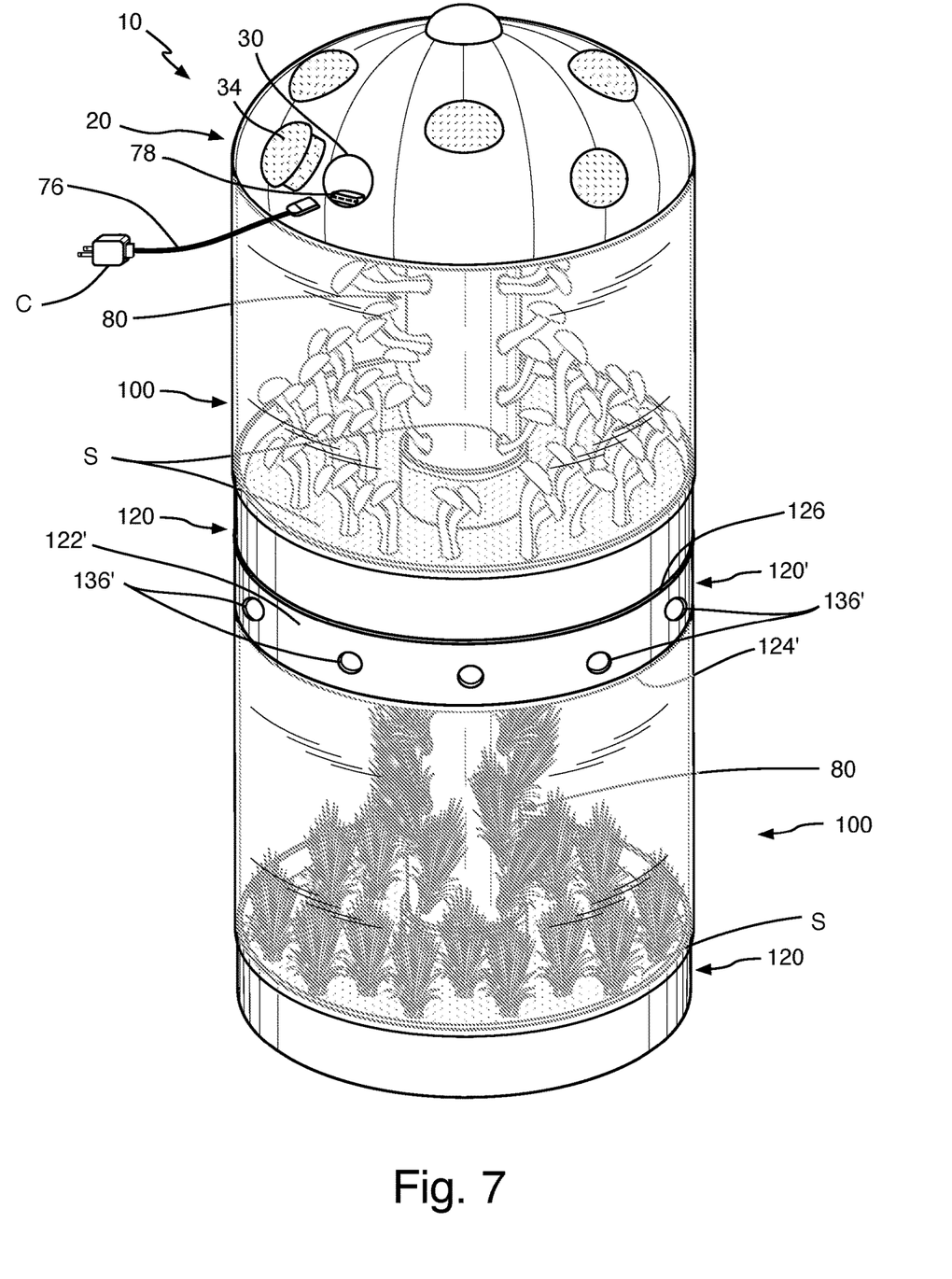
FIG. 7 shows an alternate embodiment of the invention, assembled and in use, wherein an additional mushroom grow assembly is stacked below.

As seen in FIG. 7, an alternate embodiment for the invention comprises a second mushroom grow assembly 10 mounted vertically below the first one. For this purpose, base assembly 120', having substantially the same configuration than base assembly 120, is mounted upside down instead of top cover 20.

Similar to base assembly 120, base assembly 120' comprises lateral wall 122' with upper edge 124' and bottom wall 126'. Base assembly 120' also comprises lower receiving housing 128' (not seen). Base assembly 120' further comprises peripheral holes 136' disposed around lateral wall 122'. Peripheral holes 136' allows ventilation within the lower mushroom grow assembly 10. Also, peripheral holes 136' allows injection of water therethrough.

This alternate embodiment can optionally be used to grow mushrooms, at the top mushroom grow assembly 10 and other type of plants at the lower mushroom grow assembly 10. It is noticed that, with this embodiment more than one additional mushroom grow assembly 10, can be stacked vertically.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mushroom grow assembly, comprising:
   A) a top cover comprising a top cover wall having a top end and a peripheral edge, said top cover wall further comprising a top opening and at least one through opening, said peripheral edge having a first diameter, said top cover further comprising an upper receiving housing and a water chamber disposed inside said upper receiving housing, said water chamber comprises a first bottom wall;
   B) a base assembly having a second diameter, said second diameter being approximately of a same dimension that of said first diameter;
   C) a post has a first substantially cylindrical shape and having a third diameter, a second bottom wall is mounted to said base assembly and a top edge is introduced inside said upper receiving housing;
   D) a transparent cover mounted to said base assembly and said top cover, surrounding said post, said transparent cover having a fourth diameter, said upper receiving housing has a second substantially cylindrical shape and comprises a first lateral wall, a first upper end and a first lower edge, said first lateral wall extends downwardly a first predetermined distance from said top end, said first lateral wall having a fifth diameter, said water chamber has a third substantially cylindrical shape and comprises a second lateral wall and a second upper end, said second lateral wall has at least one lateral opening, and said first bottom wall has at least one bottom hole, said second lateral wall extends downwardly from said top opening a second predetermined distance, said second lateral wall having a sixth diameter.

2. The mushroom grow assembly set forth in claim 1, wherein said post further comprises a third lateral wall said third lateral wall having said top edge and at least two holes.

3. The mushroom grow assembly set forth in claim 2, wherein said top edge is introduced inside said upper receiving housing until said top edge reaches said top end in a way that an upper portion of said post is housed within said upper receiving housing, and said water chamber is cooperatively disposed inside said upper portion of said post.

4. The mushroom grow assembly set forth in claim 3, wherein said first diameter of said peripheral edge, said second diameter of said base assembly and said fourth diameter of said transparent cover are of a same dimensions.

5. The mushroom grow assembly set forth in claim 3, wherein said water chamber further includes a water pump, said water pump is installed within said water chamber and covers said at least one bottom hole, said water pump is connected to said hygrometer to pump water into said post through said lateral openings according to the needs set and measured by said hygrometer.

6. The mushroom grow assembly set forth in claim 1, wherein said top cover further comprises a light assembly.

7. The mushroom grow assembly set forth in claim 6, wherein said light assembly is secured to the interior of said top cover wall adjacent to said peripheral edge, said light assembly is configured to be battery charged, said light assembly comprises a light strip, at least one light, a battery and a charger port.

8. The mushroom grow assembly set forth in claim 1, wherein said top opening cooperatively receives a cap, and said at least one through opening cooperatively receive a filter cap, said filter cap is configured to let air go through while keeping a free bacteria environment within mushroom grow assembly.

9. The mushroom grow assembly set forth in claim 1, wherein said transparent cover comprises a fourth lateral wall, a first upper edge and a second lower edge, said first upper edge has an upper channel and said second lower edge has a lower channel.

10. The mushroom grow assembly set forth in claim 9, wherein said base assembly further comprises a fifth lateral wall and a third bottom wall, said fifth lateral wall having a second upper edge.

11. The mushroom grow assembly set forth in claim 10, wherein said base assembly further comprises lower receiving housing, said lower receiving housing having a sixth lateral wall with a third upper edge and a lower end.

12. The mushroom grow assembly set forth in claim 11, wherein said upper channel cooperatively receives said peripheral edge therein, and said lower channel cooperatively receive said second upper edge therein.

13. The mushroom grow assembly set forth in claim 11, wherein said base assembly further comprises peripheral holes, said base assembly, in an upside down disposition, replaces said top cover to allow at least one additional said mushroom grow assembly be stacked below.

14. The mushroom grow assembly set forth in claim 1, wherein said first lateral wall has an hygrometer holder.

15. The mushroom grow assembly set forth in claim 14, wherein said hygrometer holder holds a hygrometer, which measures the amount of water vapor with within said mushroom grow assembly.

16. The mushroom grow assembly set forth in claim 1, wherein said first predetermined distance is such that said first lower edge reaches and is horizontally aligned with said peripheral edge.

17. The mushroom grow assembly set forth in claim 1, wherein said post is filled with an inoculated substrate, said inoculated substrate comprising mushroom substrates.

* * * * *